May 24, 1960 W. E. KNIEL 2,938,150
PHASE FAILURE PROTECTOR
Filed Sept. 10, 1956 6 Sheets-Sheet 1

INVENTOR
WOLFGANG E. KNIEL

BY Adrian L. Bateman, Jr.

ATTORNEY

May 24, 1960  W. E. KNIEL  2,938,150
PHASE FAILURE PROTECTOR
Filed Sept. 10, 1956  6 Sheets-Sheet 3

INVENTOR
WOLFGANG E. KNIEL

BY Adrian L. Bateman, Jr.

ATTORNEY

May 24, 1960 W. E. KNIEL 2,938,150
PHASE FAILURE PROTECTOR
Filed Sept. 10, 1956 6 Sheets-Sheet 4

INVENTOR
WOLFGANG E. KNIEL
BY
ATTORNEY

INVENTOR
WOLFGANG E. KNIEL

BY Adrian L. Bateman, Jr.

ATTORNEY

INVENTOR
WOLFGANG E. KNIEL

BY Adrian L. Bateman, Jr

ATTORNEY

United States Patent Office 2,938,150
Patented May 24, 1960

2,938,150

PHASE FAILURE PROTECTOR

Wolfgang E. Kniel, Bayside, Wis., assignor to Allen-Bradley Company, Milwaukee, Wis., a corporation of Wisconsin Filed Sept. 10, 1956, Ser. No. 608,886

19 Claims. (Cl. 317—46)

This invention relates to the protection of polyphase apparatus such as motors and transformers, and particularly to the protection of such apparatus against the interruption of one or more phase of a polyphase supply source. More specifically the invention relates to protective means utilizing current transformers having separate primary windings connected in series with each of the feeder lines and a common secondary voltage coil linking flux produced by the primaries, said voltage coil being connected to maintain a holding circuit as long as the currents flowing in the primaries are balanced and symmetrical.

The interruption of supply lines feeding polyphase apparatus (as by a fuse blowing) produces varying effects, depending upon the number of phases in the supply, the number and kind of apparatus being supplied and the location of the interruption in the supply network. For example, in a three phase system with several motors running, the failure of a single supply phase produces no marked effect as the motors will, among themselves, compensate in part for the missing phase by acting as phase balancers. However, if there are but two motors operating on such a single-phased line, the compensation is inadequate and likely to become unstable, and a single motor running alone on the line will continue to run as a poor single phase motor.

Such a single-phased motor, if operating at rated load, will be subjected to the square root of three times normal load current, creating obvious danger of burnout. If the load torque on such a motor is less than sixty percent of its rated torque, dangerous temperature rise is unlikely, but the motor will continue to run in the same direction after its connections are reversed. It is common practice to utilize three phase motors in so-called "plugging to reverse" duty, where the phases are abruptly reversed to reverse the direction of rotation of the motor, in applications such as hoists, machine tool drives and the like. Severe injury to personnel, or damage to machinery or work in progress may result from the failure of such motors to reverse.

If a three phase motor at standstill is connected to a three phase supply with one phase open, it will develop no torque at all due to the absence of a rotating magnetic field, and consequently will not start. Under this condition the locked rotor current will be only 87 percent of the three phase locked rotor current, which will not trip overload protection devices relying upon current quantity alone. Further, under the aforesaid condition, the heating effect will be only 75 percent of the three phase locked rotor heating effect, which may be insufficient to trip thermal overload protectors, but burn-out may nevertheless occur because a motor at standstill is not properly ventilated. Since the starter is closed, even though the motor is not running, subsequent sequences in associated control systems may be initiated, causing injury to operators or damage to associated mechanical elements.

The aforementioned situations occur in a three phase system supplied directly by a generator or through a Y—Y transformer, or through a delta-delta transformer. If the supply is through a Y-delta or a delta-Y transformer without a neutral, a primary phase failure will cause current to flow in all three motor windings, but in the ratio of approximately 1 to 1 to 2. Thus, overload relays which are in only two phase lines, as is a common practice, may fail to give any response resulting in one burned out winding, which produces single phasing and the additional difficulties previously pointed out.

From the foregoing illustrations it is apparent that protection of motors against phase failure is a complex problem, as the manifestations of such a failure vary depending upon the nature of the supply network, the presence of other machines on the line, and the location of the failure with respect to transformers in the supply network. It is a principal object of this invention to provide a phase failure protector that will operate positively and quickly to disconnect polyphase apparatus from its supply line irrespective of the location or nature of the phase interruption. Further objects of the invention are to provide such phase failure protection without substantial power consumption or voltage drop in the protection apparatus.

When a polyphase machine, as for example an induction motor, is thrown on the line, transient inrush currents of large value occur. Such currents are generally of short duration (usually 3 to 10 cycles in the case of a motor), however, and settle down rapidly to running values. A further object of the invention is to provide a protector which will not react to such transient currents.

In order to effect economies in production and distribution, and in order to simplify stocking of complete units and replacements parts therefor, a phase failure protector should have a wide current range, a shortcoming of present devices. The current range that is required to protect a horsepower range of, for example, 4 to 1 is substantial when it is remembered that the protector must respond with equal effectiveness to the minimum current drawn by the smaller motor and the maximum locked rotor current drawn by the larger. Considering one example of a 4 to 1 horsepower range, a 10 horsepower, 220 volt, 3 phase, 3600 r.p.m. motor has a pure magnetizing current under overhauling load of approximately 5 amperes. A 40 horsepower, 220 volt, 3 phase, 600 r.p.m. motor will have a locked rotor current plus safety factor as high as 3000 amperes. This requires a current range in the phase failure protector of 3000 to 5 or 600 to 1 for a horsepower range of 40 to 10 or 4 to 1. It is a further object of this invention to provide a protector that may have a current range of the order of 600 to 1.

A still further object of the invention is to provide a phase failure protector that will lock out after it has been tripped, so that a reset button must be pressed before starting can be repeated, as a protection against inadvertent starting after the missing phase has been resupplied.

According to the invention current transformers are placed in each line of the supply, such transformers having a primary winding in series with the supply, a magnetic core which saturates at the minimum magnetizing current of the smallest load machine, and a single, common secondary winding linking the flux produced by the plural primary windings. The secondary winding is a part of a holding circuit for a main line contactor which will remain closed only if a predetermined minimum voltage is induced in the aforesaid secondary winding. As will be clear from the following detailed description, this minimum induced secondary voltage can be maintained only if balanced and/or symmetrical currents are flowing in the primary windings and hence in the feed lines to the machine.

Further details and objects of the invention will be apparent from the following description and from the drawings, in which is illustrated an embodiment of the invention for protecting three phase motors. Referring to the drawings.

Figure 1:
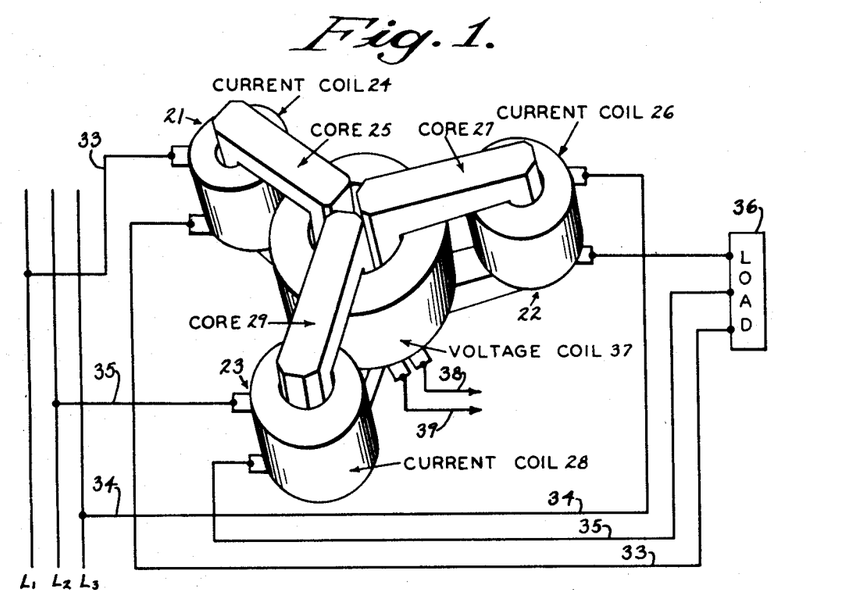
Fig. 1 illustrates in perspective a current transformer having three primary current coils, three magnetic cores and a common secondary voltage coil linking all of the cores.

Referring to the details of the drawings, Fig. 1 illustrates in perspective the current transformers and voltage coil forming the sensing element of the phase failure protector. Three identical current transformers indicated generally as 21, 22 and 23 are composed respectively of identical current or primary coils 24, 26 and 28 and magnetic cores 25, 27 and 29. The current coils are preferably wound of heavy copper wire or strip having sufficient current carrying capacity to carry the maximum load to which the protector will be subjected without overheating, and under these circumstances the power consumed in the current coils will be negligible as will be the voltage drop across the coils. The magnetic cores 25, 27 and 29 are preferably of the well known laminated construction or other materials of suitable magnetic properties, and are selected so that the minimum current drawn by the lowest horsepower motor or other device to be protected will provide sufficient flux for saturation at 30 electrical degrees. As is clear in Fig. 1, the current coils 24, 26 and 28 are connected in series with the feed lines 33, 34 and 35 of a load 36, which is supplied from a three phase source $L_1$, $L_2$, $L_3$.

As shown in Fig. 1, the current coils 24, 26 and 28 surround one leg of the cores 25, 27 and 29, while a single secondary or voltage coil 37 surrounds another leg of the cores. The voltage coil is thus influenced by flux in each of the three cores, and a net voltage is induced therein. The secondary coil is connected by leads 38, 39 to a holding circuit described fully hereafter.

Figure 2:
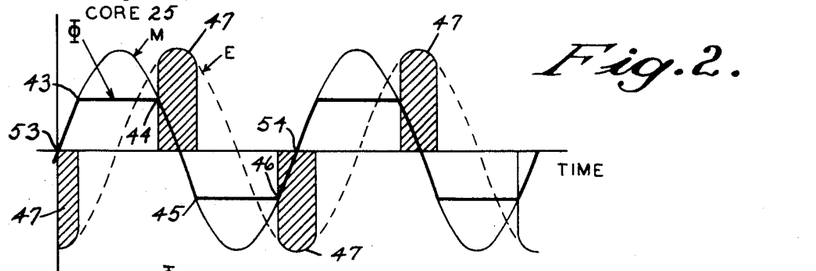
Figs. 2, 3 and 4 are curves illustrating the magnetomotive force M produced by a steady, balanced and symmetrical three phase current in the primary windings of Fig. 1, the flux Φ produced thereby in the cores of Fig. 1, and the voltage E induced thereby in the secondary voltage coil.
Figure 3:
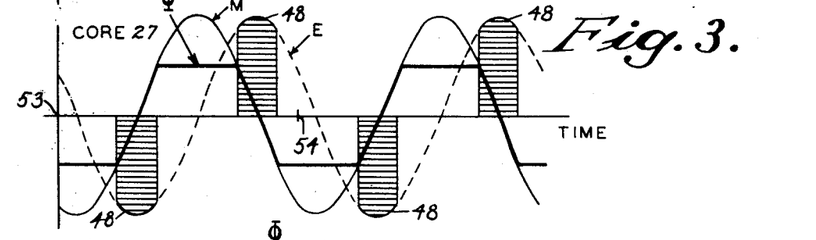
Figure 4:
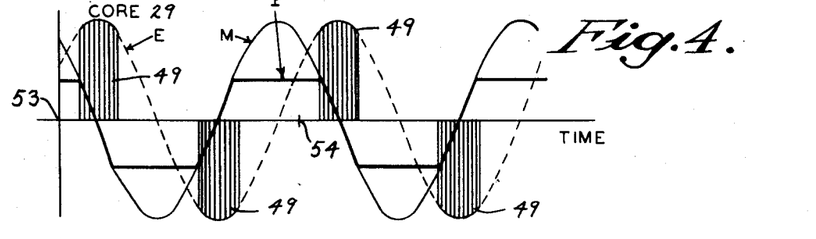

In Figs. 2, 3 and 4 the magnetomotive force M produced by a balanced three phase sinusoidal current flowing in the primary coils of Fig. 1, the core flux Φ resulting therefrom and the voltage E induced in the secondary coil as a result thereof have been plotted against time for a three phase symmetrical supply. Fig. 2 represents the aforesaid quantities for current transformer 21, Fig. 3 for current transformer 22 and Fig. 4 for current transformer 23.

Referring to Fig. 2, particularly the first half cycle thereof, the magnetomotive force M may be seen to follow a sine wave, which will be in phase with the sinusoidal supply current. The flux Φ produced in core 25 follows the sinusoidal curve of magnetomotive force to point 43, which is at 30 electrical degrees, and thereafter remains nearly constant as the magnetomotive force rises because the core 25 is saturated. Figs. 2, 3 and 4 are idealized to facilitate description, and the slight rise in flux which occurs after saturation in a practical embodiment will be described hereafter. As the magnetomotive force M decreases beyond point 44 (150 electrical degrees) the flux also decreases. A similar curve is traced in the following negative half cycle, with saturation occurring from 210 (point 45) through 330 (point 46) electrical degrees. Two complete cycles are illustrated in Fig. 2.

The voltage induced in secondary coil 37 is represented by the curve E in Fig. 2. If core 25 did not saturate, the induced voltage would follow the complete curve of E, since $E = -d\Phi/dt$. However, saturation of the core 25 causes the voltage induced in secondary coil 37 to appear as a series of pips as indicated by the shaded areas 47 in Fig. 2. The portion of curve E during which no substantial voltage is induced in secondary coil 37 is indicated by dotted lines.

Fig. 3 indicates in a similar manner by shaded areas 48 the voltage induced in secondary coil 37 from current coil 26 and core 27, and Fig. 4 by shaded areas 49 the voltage induced from current coil 28 and core 29. The primary currents have been assumed to be equal and symmetrical, that is 120 electrical degrees apart in time.

Figure 5:
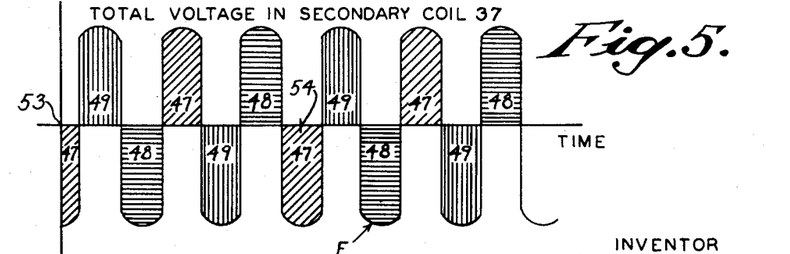
Fig. 5 is a curve illustrating the total voltage induced in the secondary voltage coil by the fluxes illustrated in Figs. 2, 3 and 4.

As a result of the three primary currents, the secondary voltage coil 37 has induced therein a voltage of three times the primary frequency, as is clearly shown in Fig. 5 in which three complete cycles of voltage can be seen between point 53, representing zero electrical degrees, and point 54 representing 360 electrical degrees. For comparison points 53 and 54 are also shown in Figs. 2, 3 and 4.

The core saturation characteristic illustrated in Figs. 2, 3 and 4 is preferred, that is, saturation at 30 electrical degrees for the lowest current drawn by the smallest device to be protected by the phase failure protector. Saturation at less than 30 electrical degrees would have the effect of narrowing the shaded areas of induced voltage 47, 48 and 49 along the time axis, which would produce a discontinuous curve in Fig. 5, or one which is less of an approximation of a sine wave and has higher peak values than the curve of Fig. 5.

As will be clear from subsequent description, it is desirable to have a fairly high value of average secondary voltage under symmetrical conditions so that the secondary voltage differential between balanced and unbalanced primary currents will be pronounced and give a rapid and abrupt action in the holding circuit of which the secondary coil forms the sensing element. Therefore, saturation at appreciably in excess of 30 electrical degrees for the lowest current is not preferred as cancellation of induced secondary voltages occurs, reducing the average output voltage of the secondary coil.

The separate magnetic cores as illustrated in Fig. 1 at 25, 27 and 29 are likewise preferred, as with this arrangement the flux paths each produce their separate effects in secondary coil 37 and there is no tendency for fluxes flowing in opposite directions to cancel and reduce the net flux below saturation.

Figure 6:
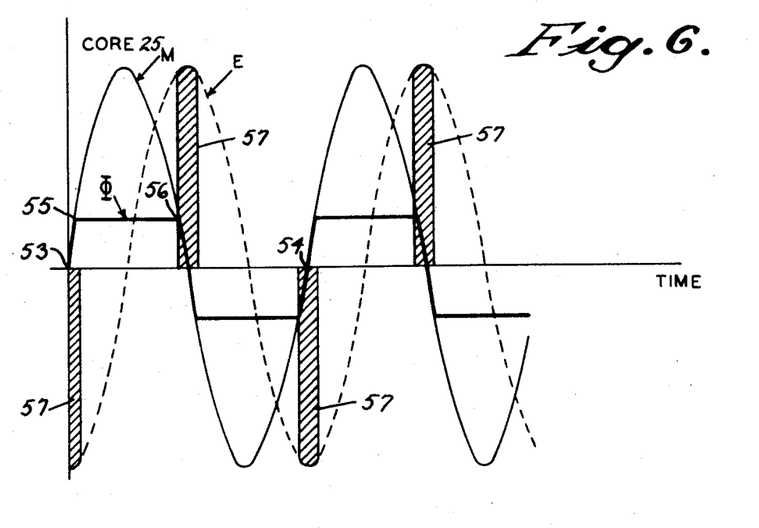
Fig. 6 is a curve illustrating the magnetomotive force M, flux Φ and induced secondary voltage E for one current transformer when the primary current is twice the value illustrated in Figs. 2, 3 and 4.

Fig. 6 illustrates the effect of an increase in primary or load current in coil 24 of Fig. 1, which similarly increases the magnetomotive force M plotted in Fig. 6. In order to permit comparison with the curves of Fig. 2, the curves in Fig. 6 have been drawn to the same scale, with the peak magnetomotive force of Fig. 6 double that of Fig. 2. The curve of flux Φ in Fig. 6 has again been idealized and it may be seen to follow the curve of magnetomotive force M to the point of saturation, which is point 55 in the first half cycle, and thereafter remains constant to point 56 where the flux falls with falling magnetomotive force M until the core again becomes saturated in the following negative half cycle. Because the peak magnetomotive force has been increased to double the value in Fig. 2, the curve M rises and falls more steeply, so that in Fig. 6 saturation at point 55 occurs at less than 30 electrical degrees and obtains until after 150 electrical degrees of time. The increased slope of the curve of flux Φ increases the maximum or instantaneous value of induced voltage E, but the longer time of saturation when no secondary voltage is induced decreases the time or transverse dimension of shaded area 57, which will be recognized as the integral representing net induced secondary voltage and hence a measure of its average value. As in Figs. 2, 3 and 4 the dotted portion of the curve of induced voltage E represents voltage which would have been induced in the secondary coil 37 if core 25 were not saturated.

Figure 7:
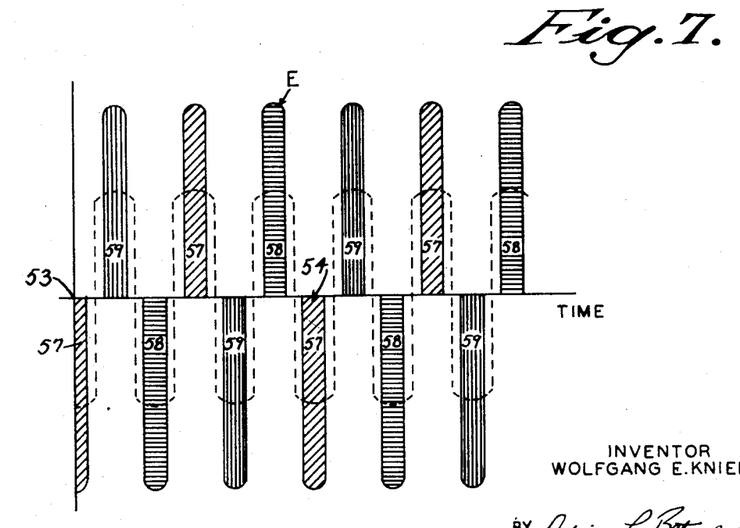
Fig. 7 is a curve illustrating the induced secondary voltage from three balanced, symmetrical, primary currents of a three phase system and of the current value illustrated in Fig. 6.

Fig. 7 corresponds with Fig. 5 and shows the total induced voltage in secondary coil 37 resulting from balanced, symmetrical and equal currents of the value illustrated in Fig. 6 flowing in all three of the primary coils 24, 26 and 28. Shaded areas 57 represent secondary voltage induced by the flux in core 25, areas 58 by the flux in core 27 and areas 59 by the flux in core 29. To facilitate comparison with Fig. 5, the induced voltages of Fig. 5 have been shown on Fig. 7 in dotted lines. It may be seen that the effect of doubling the primary or load current is to approximately double the peak value of the induced secondary voltage, but the average value of the secondary voltage remains substantially constant. As in Fig. 5, the secondary voltage illustrated in Fig. 7 also has a fundamental frequency three times the frequency of the primary or load current. Increasing the primary or load current still further produces similar results, that is the average value of induced secondary voltage remains substantially constant and its fundamental frequency remains at substantially three times the frequency of the primary current.

Figure 8:
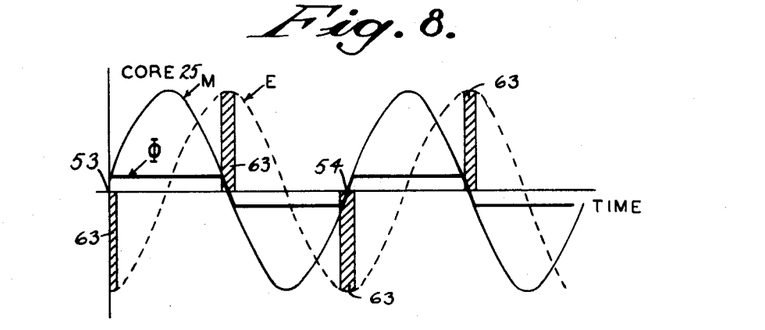
Figs. 8 and 9 are curves illustrating the magnetomotive force M, flux Φ produced thereby and secondary induced voltage E if one phase of a three phase supply is interrupted.
Figure 9:
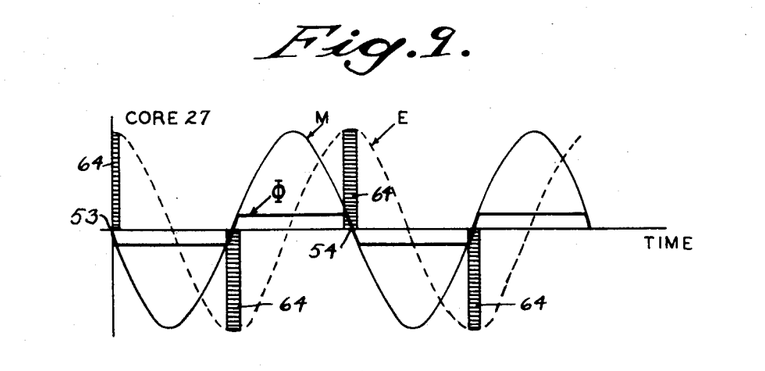
Figure 10:
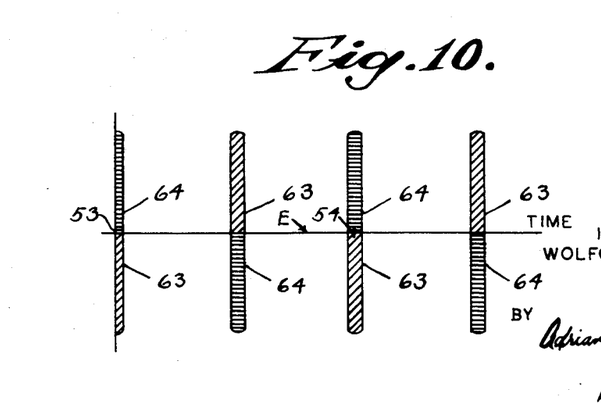
Fig. 10 is a curve illustrating the total induced secondary voltage resulting from the condition portrayed in Figs. 8 and 9, and demonstrates that the net secondary induced voltage is zero.

Figs. 8, 9 and 10 illustrate the result of a phase failure by the interruption of line 35 or L₂ of Fig. 1, with which current transformer 23 is series connected. In this circumstance, current transformer 21 behaves in the manner graphically illustrated in Fig. 8, current transformer 22 responds as illustrated in Fig. 9 and the induced voltages in secondary coil 37 will be those illustrated in Fig. 10. The load has been assumed to be a single motor, in which case no current will flow in current transformer 23.

Referring to Fig. 8, the magnetomotive force M produced by primary current coil 24, the flux Φ in core 25 and the induced voltage E are illustrated as previously described for Figs. 2, 3 and 4. As mentioned heretofore, the failure of one phase of a three phase direct feed line increases the current drawn by the remaining two lines of a single motor load. Thus the pips of induced voltage indicated by shaded areas 63 are seen to be relatively narrow along the time axis, indicating that current considerably in excess of the minimum design value is flowing.

The interruption of one line of the three wire, three phase system leaves but one phase connected to the load, and the motor load under consideration has become "single phased" as brought out earlier. The current flowing in current transformer 22 is thus displaced 180 degrees, or is 180 degrees out of phase with the current in transformer 21. Fig. 9 illustrates the magnetomotive force M, flux Φ and induced voltage E for transformer 22 and these curves may be observed to be 180 degrees out of phase with the corresponding curves in Fig. 8. Shaded areas 64 illustrate the pips of voltage induced in secondary coil 37.

In Fig. 10, the pips of voltage 63 and 64 of Figs. 8 and 9 respectively have been reproduced to show that they are equal and opposite, and therefore cancel out, leaving zero net induced secondary voltage in coil 37. The curve of net secondary voltage therefore follows the time axis in Fig. 10 as indicated by the symbol E.

As pointed out previously, the most difficult condition to protect is the one in which a phase failure occurs in the primary of a delta-Y transformer feeding a load without a neutral or in the primary of a Y-delta transformer feeding a load. Figs. 11, 12, 13 and 14 illustrate graphically the functioning of the sensing unit of Fig. 1 when a primary phase failure occurs in either of the delta-Y or Y-delta cases above mentioned.

Figure 11:
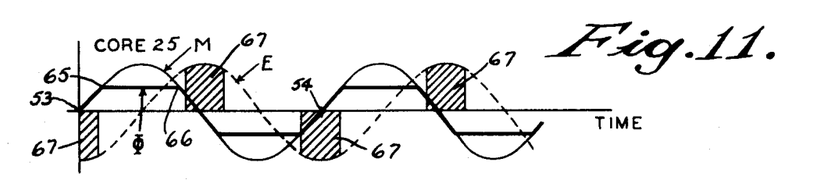
Figs. 11, 12 and 13 are curves illustrating primary magnetomotive force M core flux Φ and induced secondary voltage E when a Y-delta supply transformer suffers a loss of one primary phase and the secondary currents assume the ratio 1 to 2 to 1 in Figs. 11, 12 and 13 respectively.
Figure 12:
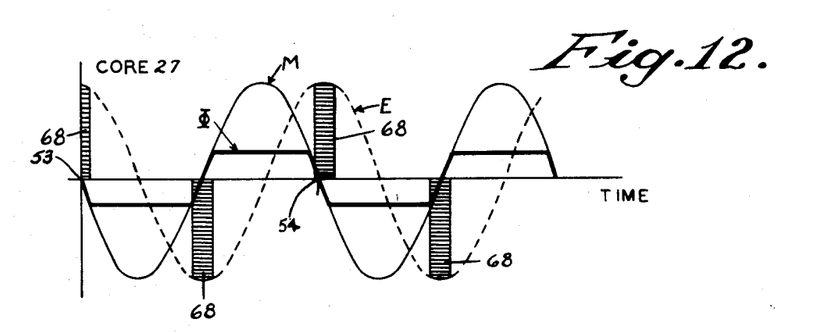
Figure 13:
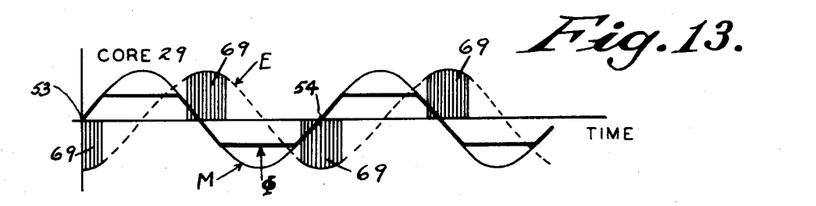

Figs. 11, 12 and 13 are drawn to the same scale and it may be seen that the currents flowing in lines 33, 34 and 35 have assumed the ratio of 1 to 2 to 1. Minimum current values have been selected in order to illustrate that the sensing unit functions even though low currents are flowing and there is no immediate danger of burning out a winding. Previous phase failure protectors requiring excessive overload currents in order to trip are wholly inoperative at the low current values illustrated in Figs. 11, 12 and 13.

In Fig. 11, the magnetomotive force M produced by current coil 24, the flux Φ resulting therefrom in core 25 and the voltage E induced in secondary coil 37, are shown. Since low current values in feed line 33 have been selected for illustration, it may be noted that flux saturation occurs at point 65, which is at approximately 30 electrical degrees. The flux curve has been idealized as previously and therefore remains constant after saturation until point 66 corresponding to approximately 150 electrical degrees is reached. The curve of flux Φ then follows the curve of magnetomotive force M until saturation again occurs in the flowing negative half cycle. The pips of voltage induced in secondary coil 37 are indicated by shaded areas 67, and the complete curve of induced voltage E which would have resulted without core saturation is indicated by a dotted line as previously.

Fig. 12 similarly indicates the magnetomotive force M core flux Φ and induced voltage E for current transformer 22, the shaded areas 68 indicating pips of voltage induced in secondary coil 37. Because the current flowing in line 34, and therefore through current coil 26, is double that illustrated in Fig. 11, the magnetomotive force M and induced voltage indicated by shaded areas 68 have approximately double the peak values illustrated in Fig. 11. For reasons previously pointed out, the dimension of shaded areas 68 along the time axis is less than the corresponding shaded area 67 in Fig. 11. It may be observed that the magnetomotive force M in Fig. 12 to 180 degrees out of phase with the magnetomotive force in Fig. 11, and hence the induced voltage in coil 37 represented by area 68 in Fig. 12 is 180 degrees out of phase with the induced voltage represented by area 67 in Fig. 11.

Fig. 13 illustrates the magnetomotive force M, flux Φ and induced secondary voltage E for current transformer 23. Shaded areas 69 represent pips of voltage induced in secondary coil 37 by virtue of the flux Φ present in core 29. It may be observed that this induced voltage is in phase with and hence additive to the voltage produced by current transformer 21 as shown in Fig. 11.

Figure 14:
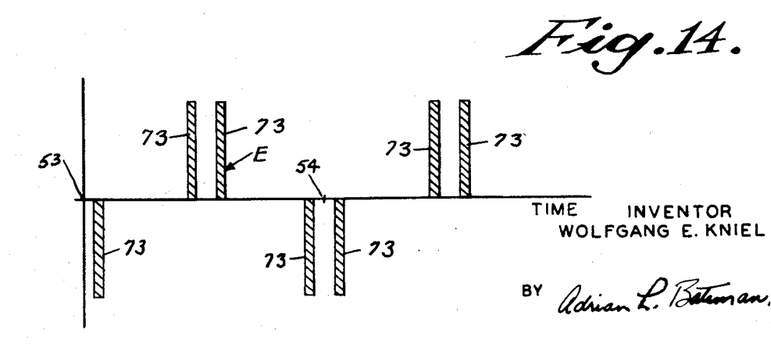
Fig. 14 is a curve illustrating net induced secondary voltage for the condition illustrated in Figs. 11, 12 and 13.

Fig. 14 illustrates the net induced voltage in secondary coil 37 as a result of the unequal currents flowing in the primaries of the current transformers as illustrated in Figs. 11, 12 and 13. It may be observed that voltage areas 67 and 69 in Figs. 11 and 13 are additive but voltage area 68 in Fig. 12 is subtractive so that the net induced voltage in secondary coil 37 is a series of pairs of voltage pips of extremely short duration as indicated by the shaded areas 73 in Fig. 14. Because of the short duration or time axis dimension of the pips 73, the average induced voltage in secondary coil 37 for the unbalanced primary current condition illustrated in Figs. 11 through 14 inclusive is approximately one-third of the average induced voltage resulting from symmetrical and equal primary currents, that is the conditions illustrated in Figs. 2 through 5 inclusive. In Fig. 14 the frequency of the induced secondary voltage is the same as the frequency of the primary load currents, as is apparent by noting that a single cycle between points 53 and 54 of Fig. 14 corresponds with a single cycle between corresponding points 53 and 54 in Figs. 11, 12 and 13. Point 53 represents zero electrical degrees and point 54 represents 360 electrical degrees.

Figure 15:
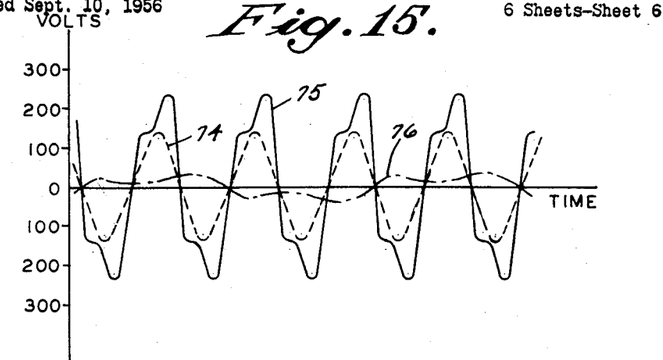
Fig. 15 illustrates smoothed and filtered secondary voltage as shown by oscillogram for equal and symmetrical primary currents of low and high values, and in addition shows smoothed and filtered secondary voltage for primary currents which are unequal.

As pointed out previously, for balanced and symmetrical currents, the frequency of the voltage induced in secondary coil 37 is substantially three times the frequency flowing through each of the primary current coils, or the frequency of the polyphase source. Thus, for balanced and symmetrical 3 phase, 60 cycle source currents, the output of secondary voltage coil 37 will be about 180 cycles. By connecting a suitable capacitor in shunt with the output leads 38 and 39 of the secondary voltage coil, a parallel resonant circuit can be established utilizing the capacitor and the self-inductance of secondary coil 37. By thus tuning the secondary coil, its output voltage will become modified toward a sine wave. Fig. 15 illustrates graphically the output of secondary voltage coil 37 with such a capacitor connected across its output terminals. The dotted line curve 74 of Fig. 15 is an oscillogram of a tuned secondary voltage coil 37 for a condition of minimum, balanced, symmetrical primary current. The full line curve 75 is an oscillogram of a tuned secondary voltage coil responding to balanced, symmetrical, primary currents of approximately ten times the value of those producing the output voltage of curve 74. The dash-dot curve 76 represents the output voltage of a tuned secondary coil in response to unbalanced primary load currents, particularly those unbalanced currents produced by a primary phase failure in a Y-delta transformer, or the condition illustrated in Figs. 11 through 14 inclusive.

Figure 16:
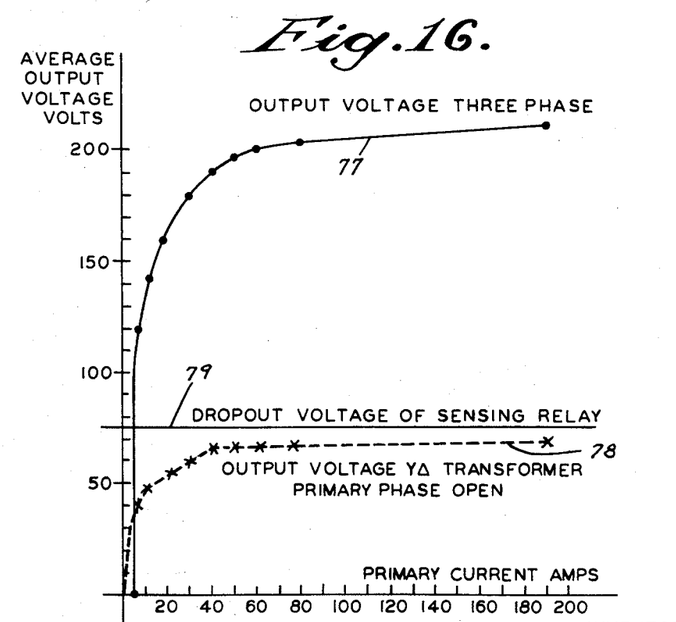
Fig. 16 is a graph illustrating the average output voltage of a secondary coil for a wide range of primary currents, both balanced and unbalanced, and the threshold value of voltage required to maintain a holding circuit; and, Fig. 17 is a line diagram of a phase failure protector constructed in accordance with the invention.

Fig. 16 is a graph of the measured output voltage of a tuned secondary voltage coil for a wide range of primary or load currents, both balanced and unbalanced. The solid line curve 77 represents output voltage for a balanced, symmetrical three phase supply or load, and the dotted line curve 78 represents secondary voltage coil output for a range of unbalanced primary currents, particularly those occurring when one primary phase of a Y-delta transformer supply source fails. From an observation of curves 77 and 78, it is apparent that the sensing unit of Fig. 1 gives a substantially constant output voltage for a wide range of primary currents, but that the curves continue to rise to somewhat higher voltage levels as the primary current increases. As pointed out in connection with the curves of core flux Φ heretofore described, the flux linking secondary voltage coil 37 will continue to rise slightly even after saturation of cores 25, 27 and 29. This is due principally to leakage flux, as is well known in the transformer art, and produces the slight rise in voltage along the substantially horizontal portions of curves 77 and 78.

From a comparison of curves 77 and 78, it is also apparent that the output voltage of the Fig. 1 sensing unit is substantially less in response to unbalanced or nonsymmetrical primary currents, over a wide range of such primary currents. The horizontal line 79 in Fig. 16 represents one logical choice of voltage output of the sensing unit which may be used as a threshold voltage for maintaining or opening a main line contactor depending upon whether such currents are balanced or unbalanced. From a study of Fig. 16, it is apparent that a wide range of balanced, symmetrical, primary load currents produce output voltages greatly in excess of the threshold voltage, while an equally wide range of unbalanced or nonsymmetrical primary currents produce an output voltage less than the threshold voltage.

Figure 17:
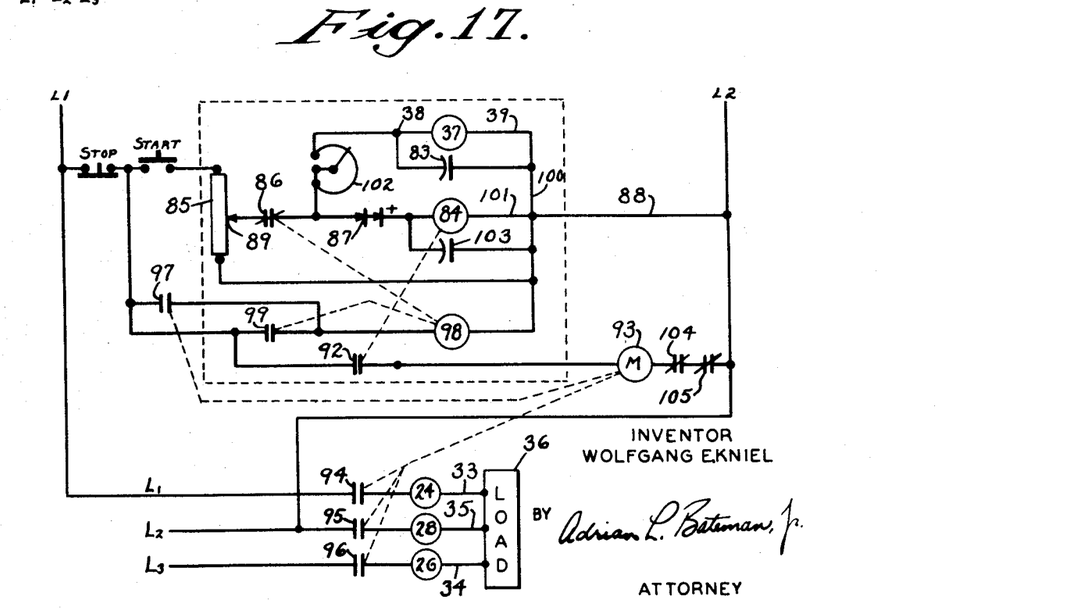

Fig. 17 is a line diagram of a phase failure protector utilizing the sensing unit of Fig. 1. As in Fig. 1, it may be seen in Fig. 17 that the current coils 24, 26 and 28 are connected in series with the feed lines 33, 34 and 35 of a load 36. Secondary voltage coil 37 is connected in parallel with a resonating capacitor 83 as previously mentioned.

The operation of the phase failure protector is as follows: When the normally open start button is depressed, a sensing relay coil 84 is connected across lines $L_1$ and $L_2$ through a portion of a potentiometer 85, normally closed relay contacts 86, a rectifier 87 and conductor 88. It may be noted that potentiometer 85 is connected directly across lines $L_1$ and $L_2$ when the Start button is depressed and thus acts as a voltage divider, with tap 89 being adjustable to give the desired voltage for operating sensing relay coil 84. Upon being energized, relay coil 84 closes normally open relay contacts 92 associated therewith (as indicated by a dotted line), which energizes the coil 93 of a main line contactor by connecting it across lines $L_1$ and $L_2$. Associated with coil 93 are three normally open main line contacts 94, 95 and 96, which are closed when coil 93 is energized, thus supplying current to load 36 through the primary current coils of the sensing unit. Also associated with coil 93 are normally open contacts 97, which are closed when coil 93 is energized, thereby activating reset coil 98 by connecting it across lines $L_1$ and $L_2$. The activation of coil 98 closes normally open contacts 99, which act as self holding contacts for coil 98 and will maintain its activation even if contacts 97 should open. The activation of coil 98 also opens the normally closed contacts 86, which removes line voltage from the sensing relay coil 84.

The opening of contacts 86, and consequent removal of line voltage from coil 84, makes the maintenance or holding of the circuit dependent upon the sensing unit of Fig. 1. Since main line contacts 94, 95 and 96 are closed, and assuming a balanced, symmetrical current is flowing through primary current coils 24, 26 and 28 to load 36, then secondary voltage coil 37 will deliver a substantial voltage through its output connections 38 and 39. This voltage, smoothed to an approximation of a sine wave by parallel resonating condenser 83, is applied to sensing coil 84 through connections 100 and 101 on the righthand side of coil 84 in Fig. 17, and through a variable resistance 102 and rectifier 87 on the lefthand side. For reasons heretofore explained, voltage induced in voltage coil 37 will continue to hold or energize coil 84 as long as the primary currents are balanced and symmetrical, but will immediately release or deenergize coil 84 if the primary load currents become unbalanced by a phase failure, in which case the output voltage of coil 37 drops below the threshold value required to energize coil 84 (see Fig. 16).

If a phase failure occurs and coil 84 is deenergized, then contacts 92 associated therewith open, which removes voltage from coil 93, thus opening main line contacts 94, 95 and 96, as well as contacts 97. As previously pointed out, the opening of contacts 97 does not deenergize reset coil 98 because of its self holding contacts 99. Thus the normally closed contacts 86 associated with reset coil 96 remain open, and pressing the start button will not reclose the main line contactor until the entire circuit has been deenergized or reset by pressing the stop button. Similarly the load 36 cannot be inadvertently resupplied until the circuit has been reset.

It may be seen that a condenser 103 is connected in shunt with sensing relay coil 84. When the start button is pressed, impressing a rectified A.C. potential across coil 84 and condenser 103, the condenser charges. Almost instantly the other relays in the circuit close in sequence and normally closed contacts 86 are opened, making the maintenance of the circuit dependent upon voltage from secondary coil 37. Since there is a large transient inrush current when many A.C. loads, such as a motor, are connected to a line, and asymmetrical currents are likely to prevail during this short transient period, the voltage induced in coil 37 might be insufficient to hold coil 84. Under these conditions, condenser 103 discharges to hold coil 84 until the transient condition subsides and the voltage from coil 37 takes over in holding coil 84. The capacitance of condenser 103 will determine the time constant of this transient asymmetrical delay feature.

If desired, thermal overload protection may be added. Since the construction of such devices is well known in the art, they are not illustrated in detail, but the normally closed contacts 104 and 105 represent the contacts of thermal overload protectors. As is apparent, the opening of either or both of contacts 104 and 105 will open the main line contacts 94, 95 and 96 in exactly the same manner as occurs when contacts 92 are opened by a phase failure. The following sequences are the same.

From the diagram of Fig. 17 it is apparent that all currents flowing in the holding circuit may be of low values, as the various relay coils may be of the well known low power consumption type. Thus the start and stop buttons may be located remotely from the load apparatus, and all operations, including starting, stopping and resetting may be remotely controlled.

The embodiment described for purposes of illustration should be considered as exemplary of, but not a limitation of the invention.

I claim:

1. A phase failure protector for polyphase apparatus comprising a normally open switch connectible to a polyphase source and to said apparatus and adapted when closed to pass current to the apparatus; a holding circuit for closing and maintaining in closed position said switch, said holding circuit including a voltage coil comprising the secondary winding of a transformer having one primary winding per phase, one of said primary windings being connectible to respond to the current flowing in each line of the polyphase supply, and a magnetic core saturable during a portion of each cycle of current flowing in each line under normal load conditions linking each of said primary windings and the secondary winding; the transformer windings and core being arranged to require balanced and symmetrical currents in the primary coils to induce sufficient voltage in the secondary voltage coil to actuate said holding circuit.

2. Apparatus according to claim 1 in which the core is saturable at approximately thirty electrical degrees.

3. Apparatus according to claim 1 in which the holding circuit includes time delay means rendering said circuit operative during transient unbalanced currents of short duration.

4. Apparatus according to claim 1 including means for disabling the holding circuit after said circuit has opened the switch in response to insufficient voltage in the secondary coil.

5. Apparatus according to claim 4 including electrical means for resetting the holding circuit.

6. Apparatus according to claim 1 including a condenser connected in shunt with the voltage coil and tuned with the self inductance of the voltage coil to approximate parallel resonance at a frequency equal to the frequency of the source multiplied by the number of phases.

7. Apparatus according to claim 1 in which the holding circuit is operable through a range of primary currents in excess of 5 to 1.

8. A phase failure protector for polyphase apparatus comprising a separated primary winding connectible in series relation with each load line of a polyphase source, a magnetic core having a plurality of flux paths disposed so that each of said primary windings links with one of said flux paths, said primary windings cyclically driving each of the flux paths of said magnetic core into and out of saturation under normal operating loads, a single secondary coil linking all of the aforesaid flux paths whereby voltage is induced in said secondary coil in accordance with the change of magnetic flux produced by current flowing in said primary coils, and means operatively connected with said secondary coil to open the load lines from the polyphase source in response to a fall in voltage in said secondary coil below a predetermined value.

9. A phase failure protector for polyphase apparatus comprising a separate primary winding connectible in series relation with each load line of a polyphase source and a secondary winding, a magnetic core cyclically driven into and out of saturation under normal operating loads and having a portion linking each of said primary windings, and a portion linking the secondary winding, whereby voltage is induced in said secondary coil in accordance with the symmetry and quantity of current flowing in said primary coils, and means operatively connected with said secondary coil to open the load lines from the polyphase source in response to a fall in average voltage in said secondary coil below a predetermined value.

10. A phase failure protector for polyphase apparatus comprising a separate primary winding connectible to produce magnetomotive force in response to the current flowing in each load line of a polyphase source, a separate magnetic core for each primary winding, each of said cores having a portion linking one of said primary windings and being arranged to saturate and desaturate during each half cycle of normal load current flowing in a respective primary winding, a common secondary coil linking a portion of each of said magnetic cores whereby voltages are induced in said secondary coil in accordance with changes in magnetic flux produced by the magnetomotive forces of the primary coils, and means operatively connected with said secondary coil to open the load lines from the polyphase source in response to a fall in voltage in said secondary coil below a predetermined value.

11. A sensing unit for a polyphase phase failure protector comprising: a magnetic core having a plurality of separate and distinct saturable flux paths; a plurality of primary windings, each primary winding being disposed about a portion of the magnetic core and adapted when energized to produce a saturating magnetic flux in one of the flux paths of said core during only a portion of each half cycle of energizing current; and a common secondary winding linking a portion of each of the flux paths whereby a net average voltage is induced in said secondary winding in response to the net change in magnetic flux in each of the separate flux paths.

12. A sensing unit for a polyphase phase failure protector comprising: a plurality of magnetic cores each having a closed, saturable flux path; a plurality of primary, one primary winding being disposed about a portion of each of the magnetic cores and adapted when energized to produce a saturating magnetic flux in the flux path of said core during approximately 120 electrical degrees of each half cycle of energizing current; and a common secondary winding linking a portion of each of the cores and flux paths whereby a net average voltage is induced in said secondary winding in response to the net change in magnetic flux in each of the separate flux paths.

13. A holding circuit for a magnetic switch adapted to connect a polyphase line to a load comprising: a sensing relay having an actuating coil and contacts adapted when closed to energize said magnetic switch; a first branch circuit electrically connected with the actuating coil of the sensing relay and connectible to a source of electrical energy, said first branch circuit including in series connection therewith starting switch means and normally closed switch means; means operatively associating the magnetic switch and the normally closed switch means whereby the latter is opened upon closing of the magnetic switch, thus interrupting electrical energy flowing in the first branch circuit; a second branch circuit connected in shunt with the sensing relay actuating coil, said second branch circuit including an alternate source of electrical energy comprising the secondary coil of a transformer having its primary coils responsive to currents flowing to the load, whereby the closing of the starting switch initially supplies electrical energy to actuate the sensing coil through the first branch circuit, but the continued actuation of the sensing coil is dependent upon electrical energy supplied by the transformer of the second branch circuit.

14. A holding circuit in accordance with claim 13 including a rectifier in series with the sensing relay actuating coil whereby rectified alternating current is supplied to said coil when alternating current is delivered by either the first or second branch circuits.

15. A holding circuit in accordance with claim 14 including a condenser in shunt with the sensing relay actuating coil for momentarily delaying deactivation of said coil if the electrical energy supply from both branch circuits fails simultaneously.

16. A holding circuit in accordance with claim 13 including means in each of the branch circuits for adjusting the voltage delivered to the sensing relay actuating coil.

17. A holding circuit in accordance with claim 13 including recycle prevention means for retaining the normally closed switch means in an open position after a failure of the alternate source of electrical energy in the second branch circuit.

18. A holding circuit in accordance with claim 17 including reset means for disabling the recycle prevention means.

19. A sensing unit for a polyphase phase failure protector comprising: a core having a plurality of saturable flux paths each closed upon itself; a plurality of exciting windings, one of said windings linking each of said flux paths for producing a flux therein when an exciting current flows in a respective winding, each of said flux paths being arranged for cyclic saturation and desaturation when it is excited; and secondary windings linking each of said flux paths to provide an induced net secondary voltage dependent upon changes in total net flux in said flux paths.

References Cited in the file of this patent
UNITED STATES PATENTS

| | | |
|---|---|---|
| 1,360,462 | Stoekle | Nov. 30, 1920 |
| 2,068,575 | Stark | Jan. 19, 1937 |
| 2,122,107 | Meller | June 28, 1938 |
| 2,476,938 | Williams et al. | July 19, 1949 |
| 2,537,990 | Graham | Jan. 16, 1951 |
| 2,672,584 | Rolf | Mar. 16, 1954 |

UNITED STATES PATENT OFFICE
CERTIFICATE OF CORRECTION

Patent No. 2,938,150                                                                 May 24, 1960

Wolfgang E. Kniel

It is hereby certified that error appears in the printed specification of the above numbered patent requiring correction and that the said Letters Patent should read as corrected below.

Column 1, line 18, for "one or more phase" read -- one or more phases --; column 6, line 73, for "to 180" read -- is 180 --; column 7, line 43, for "the capacitor", first occurrence, read -- the capacitance --; column 10, line 12, for "separated" read -- separate --; line 72, after "mary" and before the comma insert -- windings --.

Signed and sealed this 25th day of October 1960.

(SEAL)
Attest:

EARL H. AXLINE                                                   ROBERT C. WATSON
Attesting Officer                                            Commissioner of Patents